US011525317B2

(12) United States Patent
Rowe (10) Patent No.: US 11,525,317 B2
(45) Date of Patent: Dec. 13, 2022

(54) OPEN CHANNEL FLOW FROM MULTIPLE PRESSURE SENSORS

(71) Applicant: Halliburton Energy Services, Inc., Houston, TX (US)

(72) Inventor: Mathew Dennis Rowe, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 44 days.

(21) Appl. No.: 16/912,383

(22) Filed: Jun. 25, 2020

(65) Prior Publication Data

US 2021/0404273 A1    Dec. 30, 2021

(51) Int. Cl.
*E21B 21/08* (2006.01)
*E21B 21/10* (2006.01)
*G01F 1/002* (2022.01)
*G01F 1/36* (2006.01)
*G05D 7/06* (2006.01)

(52) U.S. Cl.
CPC ............ *E21B 21/08* (2013.01); *E21B 21/106* (2013.01); *G01F 1/002* (2013.01); *G01F 1/36* (2013.01); *G05D 7/0623* (2013.01)

(58) Field of Classification Search
CPC ........ E21B 21/106; E21B 47/06; E21B 21/08; E21B 21/10; G05D 7/0623; G01F 1/002; G01F 1/36
See application file for complete search history.

(56) References Cited

U.S. PATENT DOCUMENTS

| 6,868,920 | B2 | 3/2005 | Hoteit et al. |
| 7,128,167 | B2 | 10/2006 | Dunlop et al. |
| 9,175,531 | B2 | 11/2015 | Santos et al. |
| 9,765,617 | B2 | 9/2017 | Gosney et al. |
| 10,145,229 | B2 | 12/2018 | Galliano et al. |
| 10,151,159 | B2 | 12/2018 | Gattlieb et al. |
| 10,208,548 | B2 | 2/2019 | Francois |
| 10,233,741 | B2 | 3/2019 | Kronenberger et al. |

(Continued)

FOREIGN PATENT DOCUMENTS

WO    2015-142819    9/2015

OTHER PUBLICATIONS

Schlumberger, Flag/EKD, Fluid Loss and Gain Detection Service, 2013.

(Continued)

*Primary Examiner* — Brad Harcourt
(74) *Attorney, Agent, or Firm* — Benjamin Ford; C. Tumey Law Group PLLC (57) ABSTRACT

A fluid flow system may comprise an input line connected to a drilling system, one or more fluid flow lines connected to the input line, and an output line connected to the one or more fluid flow lines. The system may further include one or more valves disposed in each of the one or more fluid flow lines and one or more pressure sensors disposed in each of the one or more fluid flow lines. A method for controlling a fluid flow system may comprise moving a drilling fluid from a borehole into an input line of the fluid flow system, directing the drilling fluid through the input line into a fluid flow line, measuring a first pressure at a first pressure sensor in the fluid flow line, and measuring a second pressure at a second pressure sensor in the fluid flow line.

11 Claims, 4 Drawing Sheets

(56) References Cited

U.S. PATENT DOCUMENTS

| | | | |
|---|---|---|---|
| 10,352,159 B2 | 7/2019 | Rowe | |
| 2007/0151763 A1 | 7/2007 | Reizma et al. | |
| 2007/0246263 A1* | 10/2007 | Reitsma | E21B 21/08 175/38 |
| 2011/0198080 A1 | 8/2011 | Demong | |
| 2012/0090893 A1* | 4/2012 | Leuchtenberg | E21B 21/08 175/25 |
| 2014/0209384 A1 | 7/2014 | Hanson | |
| 2015/0361743 A1* | 12/2015 | Miikkulainen | E21B 21/106 175/24 |
| 2016/0138351 A1* | 5/2016 | Dillard | E21B 21/106 175/25 |
| 2017/0175467 A1 | 6/2017 | Francois | |
| 2017/0314382 A1 | 11/2017 | Torrione et al. | |
| 2017/0328151 A1 | 11/2017 | Walter et al. | |
| 2018/0003023 A1 | 1/2018 | Couturier et al. | |
| 2018/0230761 A1 | 8/2018 | Sehsah | |
| 2019/0118122 A1 | 4/2019 | Sehsah et al. | |
| 2020/0040677 A1 | 2/2020 | Spencer | |

OTHER PUBLICATIONS

Weatherford, Flow Measurement, 2019.

Ali, T. H., Haberer, S. M., Says, I. P., Ubaru, C. C., Laing, M. L., Helgesen, O., . . . Bjelland, B. (2013). Automated Alarms for Smart Flowback Fingerprinting and Early Kick Detection. SPE/IADC Drilling Conference.

https://www.bakerhughes.com/evaluation/surface-logging-services/operations-monitoring.

DrillFact Real-Time Monitoring Service Precise Drilling Measurements for Enhanced Decision-making and Drilling Performance.

Baker Hughes, Exception-based remote monitoring incorporates intelligence to enable early detection of well control events, 2016.

International Search Report and Written Opinion for Application No. PCT/US2021/017232, dated May 12, 2021.

Great Britain Examination Report for Application No. GB2107041.2 dated Jan. 6, 2022.

* cited by examiner

OPEN CHANNEL FLOW FROM MULTIPLE PRESSURE SENSORS

BACKGROUND

During the drilling of a hydrocarbon-producing well, a drilling fluid or "mud" is continuously circulated from a surface location down to the bottom of the wellbore being drilled and back to the surface again. While drilling the well there is a balance between the pressure in the formation and pressure in the wellbore. If these pressures become unbalanced, the drilling fluid may invade the formation at an uncontrolled rate, or the formational fluid may enter the wellbore. The earlier these events are detected by monitoring the flow into and out of the wellbore, the earlier mitigation may start to avoid a safety incident or loss of the wellbore.

BRIEF DESCRIPTION OF THE DRAWINGS

These drawings illustrate certain aspects of the present disclosure and should not be used to limit or define the disclosure.

DETAILED DESCRIPTION

The present disclosure is related to wellbore drilling operations and, more particularly, to methods and systems for a fluid flow system to monitor the fluid flow out of a borehole. Monitoring the fluid flow may prevent an unbalanced pressure between the drilling fluid and the formation fluid. During drilling operations, as a borehole is being created, the borehole is kept at a pressure above the formation to prevent formation fluid entering the well. In such a conventional "overbalanced" well, the invasion of fluid is considered a kick, and if the well is not shut-in it can lead to a blowout, a dangerous situation. Additionally, in an underbalanced well, the pressure in the wellbore is kept lower than the static pressure than the formation being drilled. As the well is being drilled, formation fluid flows into the wellbore and up to the surface. In an underbalanced well, the well is always in a blowout condition unless a heavier fluid is displaced into the borehole.

Figure 1:
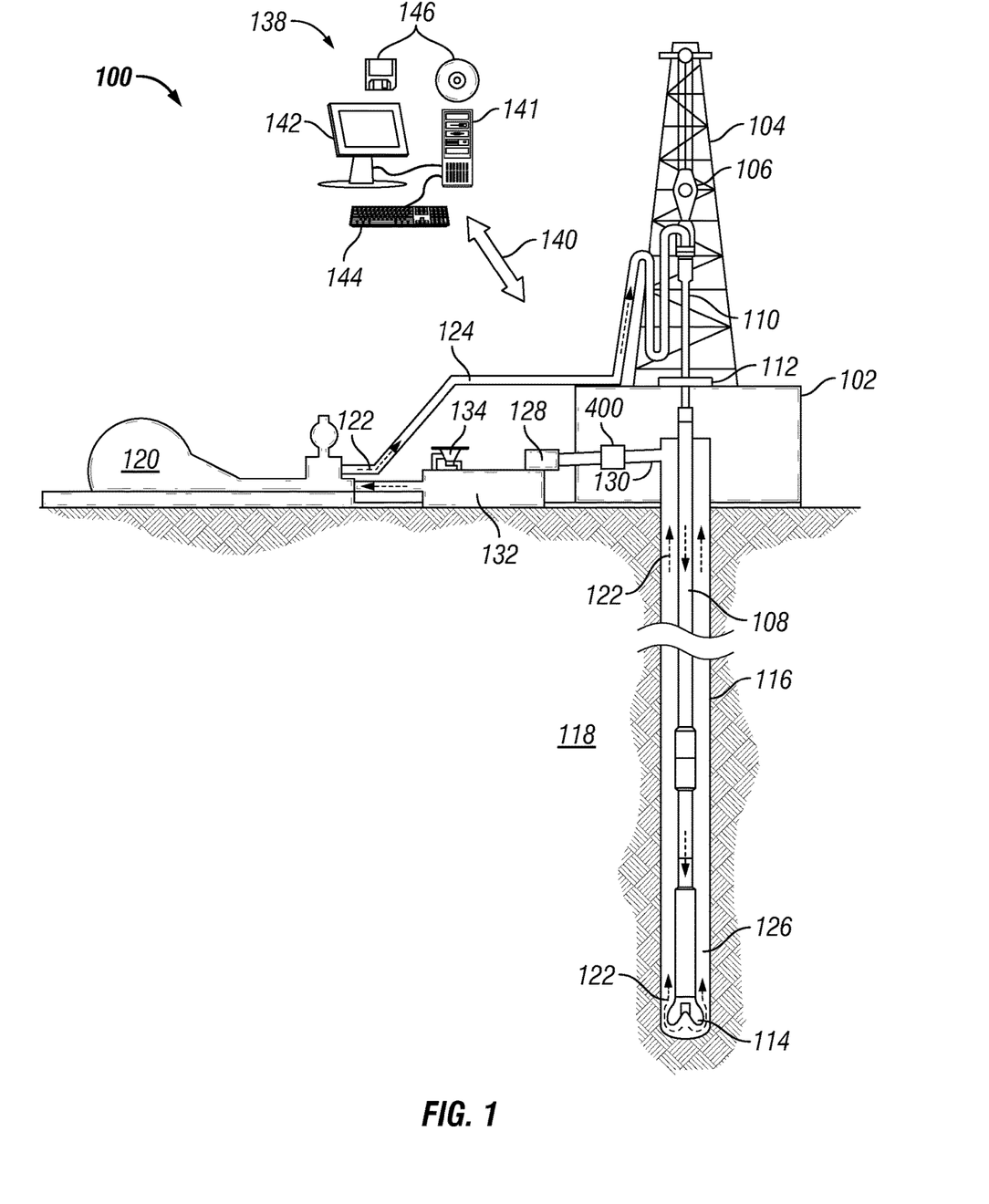
FIG. 1 is a schematic diagram of an example drilling system that may employ the principles of the present disclosure.

Referring to FIG. 1, illustrated is an example drilling system 100 that may employ the principles of the present disclosure, according to one or more embodiments. As will be discussed in further detail below, the systems and methods described below may allow for proper measurement of pressure within the borehole. Properly measuring the pressure may notify personnel of an "underbalanced" or "overbalanced" wellbore. This may allow personnel to address the situation and prevent a dangerous situation from forming during the drilling operations. It should be noted that while FIG. 1 generally depicts a land-based drilling assembly, the principles described herein are equally applicable to subsea drilling operations that employ floating or sea-based platforms and rigs, without departing from the scope of the disclosure. As illustrated, the drilling system 100 may include a drilling platform 102 that supports a derrick 104 having a traveling block 106 for raising and lowering a drill string 108. The drill string 108 may include, but is not limited to, drill pipe or coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 by the rotary table 112. As drill bit 114 rotates, it creates a borehole 116 that penetrates various subterranean formations 118. A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116.

At the surface, the recirculated or spent drilling fluid 122 exits the annulus 126 and may be conveyed to one or more fluid processing units, such as solids control equipment 128 via an interconnecting flow line 130. Interconnecting flow line 130 may include fluid flow system 400, discussed in greater detail below. The returning or spent drilling fluid 122 may contain cuttings and debris derived from the borehole 116 as the drill bit 114 grinds and scrapes the bottom and walls of the borehole 116. The spent drilling fluid 122 may also contain various solid additives, such as lost circulation materials and weighting agents, added to the drilling fluid 122 to enhance its operation. After passing through the fluid processing units, including the solids control equipment 128, a "cleaned" drilling fluid 122 may be deposited into a nearby retention pit 132 (i.e., a mud pit or suction tank). One or more chemicals, fluids, or additives may be added to the drilling fluid 122 via a mixing hopper 134 communicably coupled to or otherwise in fluid communication with the retention pit 132. The solids control equipment 128 may be configured to substantially remove drill cuttings, solids, and other unwanted debris from the drilling fluid 122 and thereby separate waste from reusable particulates or materials. The solids control equipment 128 may include one or more of shakers (e.g., shale shaker). To remove drill cuttings and other unwanted solids from the returning drilling fluid 122, shakers used in the solids control equipment 128 may include one or more shaker screens (not shown) across which the drill cuttings may traverse to be separated from the drilling fluid 122.

Without limitation, drilling system 100 may be connected to and/or controlled by information handling system 138, which may be disposed at the surface. In examples, information handling system 138 may be connected to a fluid flow system. As illustrated, communication link 140 (which may be wired or wireless, for example) may be provided that may transmit data from fluid flow system 400 to an information handling system 138. Information handling system 138 may include a personal computer 141, a video display 142, a keyboard 144 (i.e., other input devices), and/or non-transitory computer-readable media 146 (e.g., optical disks, magnetic disks) that can store code representative of the methods described herein. Likewise, information handling system 138 may process measurements taken by one or more sensors automatically or send information from sensors on fluid flow system (e.g., fluid flow system 400 shown in FIG. 4). As discussed above, the software, algorithms, and modeling is performed by information handling system 138. Information handling system 138 may perform steps, run software, perform calculations, and/or the like automatically, through automation (such as through artificial intelligence ("AI"), dynamically, in real-time, and/or substantially in real-time.

As previously mentioned, during drilling operations, as a borehole is being created, the borehole is kept at a pressure above the formation to prevent formation fluid entering the well. In such a conventional "overbalanced" well, the invasion of fluid is considered a kick, and if the well is not shut-in it can lead to a blowout, a dangerous situation. Additionally, in an underbalanced well, the pressure in the wellbore is kept lower than the static pressure than the formation being drilled. As the well is being drilled, formation fluid flows into the wellbore and up to the surface. In an underbalanced well, the well is always in a blowout condition unless a heavier fluid is displaced into the borehole. Fluid flow system 400 is used to measure fluid conditions. These measurements are sent to information handling system 138 for evaluation. Reviewing the measurements allows personnel to determine borehole conditions, such as over pressure or under pressure in the borehole.

Figure 2:
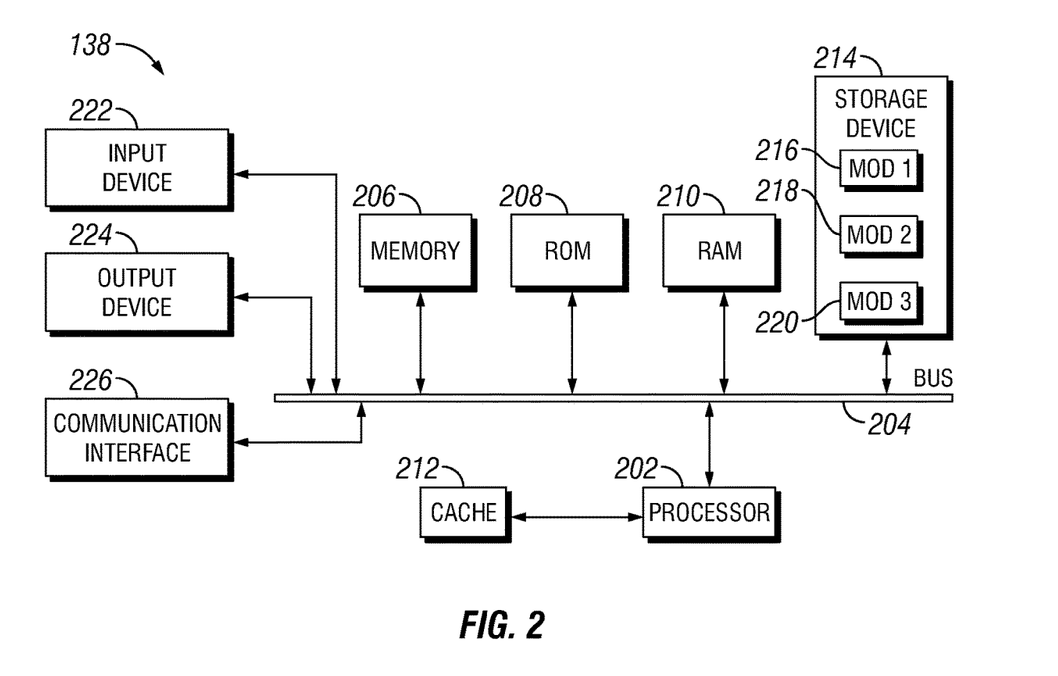
FIG. 2 is a schematic view of an example information handling system.

FIG. 2 illustrates an example information handling system 138 which may be employed to perform various steps, methods, and techniques disclosed herein. Persons of ordinary skill in the art will readily appreciate that other system examples are possible. As illustrated, information handling system 138 includes a processing unit (CPU or processor) 202 and a system bus 204 that couples various system components including system memory 206 such as read only memory (ROM) 208 and random access memory (RAM) 210 to processor 202. Processors disclosed herein may all be forms of this processor 202. Information handling system 138 may include a cache 212 of high-speed memory connected directly with, in close proximity to, or integrated as part of processor 202. Information handling system 138 copies data from memory 206 and/or storage device 214 to cache 212 for quick access by processor 202. In this way, cache 212 provides a performance boost that avoids processor 202 delays while waiting for data. These and other modules may control or be configured to control processor 202 to perform various operations or actions. Other system memory 206 may be available for use as well. Memory 206 may include multiple different types of memory with different performance characteristics. It may be appreciated that the disclosure may operate on information handling system 138 with more than one processor 202 or on a group or cluster of computing devices networked together to provide greater processing capability. Processor 202 may include any general purpose processor and a hardware module or software module, such as first module 216, second module 218, and third module 220 stored in storage device 214, configured to control processor 202 as well as a special-purpose processor where software instructions are incorporated into processor 202. Processor 202 may be a self-contained computing system, containing multiple cores or processors, a bus, memory controller, cache, etc. A multi-core processor may be symmetric or asymmetric. Processor 202 may include multiple processors, such as a system having multiple, physically separate processors in different sockets, or a system having multiple processor cores on a single physical chip. Similarly, processor 202 may include multiple distributed processors located in multiple separate computing devices, but working together such as via a communications network. Multiple processors or processor cores may share resources such as memory 206 or cache 212 or may operate using independent resources. Processor 202 may include one or more state machines, an application specific integrated circuit (ASIC), or a programmable gate array (PGA) including a field PGA (FPGA).

Each individual component discussed above may be coupled to system bus 204, which may connect each and every individual component to each other. System bus 204 may be any of several types of bus structures including a memory bus or memory controller, a peripheral bus, and a local bus using any of a variety of bus architectures. A basic input/output (BIOS) stored in ROM 208 or the like, may provide the basic routine that helps to transfer information between elements within information handling system 138, such as during start-up. Information handling system 138 further includes storage devices 214 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. Storage device 214 may include software modules 216, 218, and 220 for controlling processor 202. Information handling system 138 may include other hardware or software modules. Storage device 214 is connected to the system bus 204 by a drive interface. The drives and the associated computer-readable storage devices provide nonvolatile storage of computer-readable instructions, data structures, program modules and other data for information handling system 138. In one aspect, a hardware module that performs a particular function includes the software component stored in a tangible computer-readable storage device in connection with the necessary hardware components, such as processor 202, system bus 204, and so forth, to carry out a particular function. In another aspect, the system may use a processor and computer-readable storage device to store instructions which, when executed by the processor, cause the processor to perform operations, a method, or other specific actions. The basic components and appropriate variations may be modified depending on the type of device, such as whether information handling system 138 is a small, handheld computing device, a desktop computer, or a computer server. When processor 202 executes instructions to perform "operations", processor 202 may perform the operations directly and/or facilitate, direct, or cooperate with another device or component to perform the operations.

As illustrated, information handling system 138 employs storage device 214, which may be a hard disk or other types of computer-readable storage devices which may store data that are accessible by a computer, such as magnetic cassettes, flash memory cards, digital versatile disks (DVDs), cartridges, random access memories (RAMs) 210, read only memory (ROM) 208, a cable containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

Figure 4:
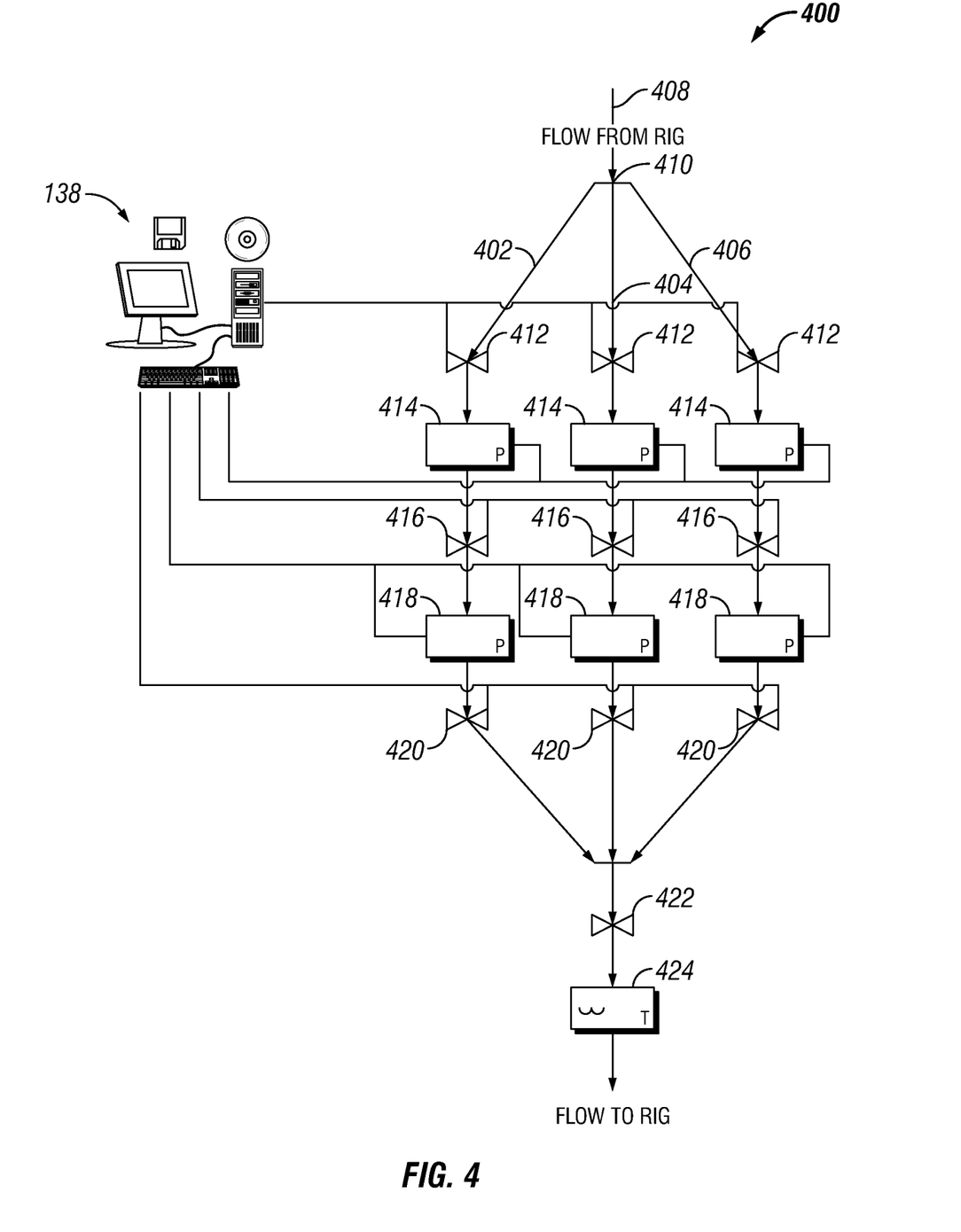
FIG. 4 is a schematic view of an example fluid flow system.

To enable user interaction with information handling system 138, an input device 222 represents any number of input mechanisms, such as a microphone for speech, a touch-sensitive screen for gesture or graphical input, keyboard, mouse, motion input, speech and so forth. Additionally, input device 222 may take in data from one or more sensors in fluid flow system 400, discussed below. An output device 224 may also be one or more of a number of output mechanisms known to those of skill in the art. In some instances, multimodal systems enable a user to provide multiple types of input to communicate with information handling system 138. Communications interface 226 generally governs and manages the user input and system output. There is no restriction on operating on any particular hardware arrangement and therefore the basic hardware depicted may easily be substituted for improved hardware or firmware arrangements as they are developed.

As illustrated, each individual component describe above is depicted and disclosed as individual functional blocks. The functions these blocks represent may be provided through the use of either shared or dedicated hardware, including, but not limited to, hardware capable of executing software and hardware, such as a processor 202, that is purpose-built to operate as an equivalent to software executing on a general purpose processor. For example, the functions of one or more processors presented in FIG. 2 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 208 for storing software performing the operations described below, and random access memory (RAM) 210 for storing results. Very large scale integration (VLSI) hardware embodiments, as well as custom VLSI circuitry in combination with a general purpose DSP circuit, may also be provided.

The logical operations of the various methods, described below, are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. Information handling system 138 may practice all or part of the recited methods, may be a part of the recited systems, and/or may operate according to instructions in the recited tangible computer-readable storage devices. Such logical operations may be implemented as modules configured to control processor 202 to perform particular functions according to the programming of software modules 216, 218, and 220.

Figure 3:
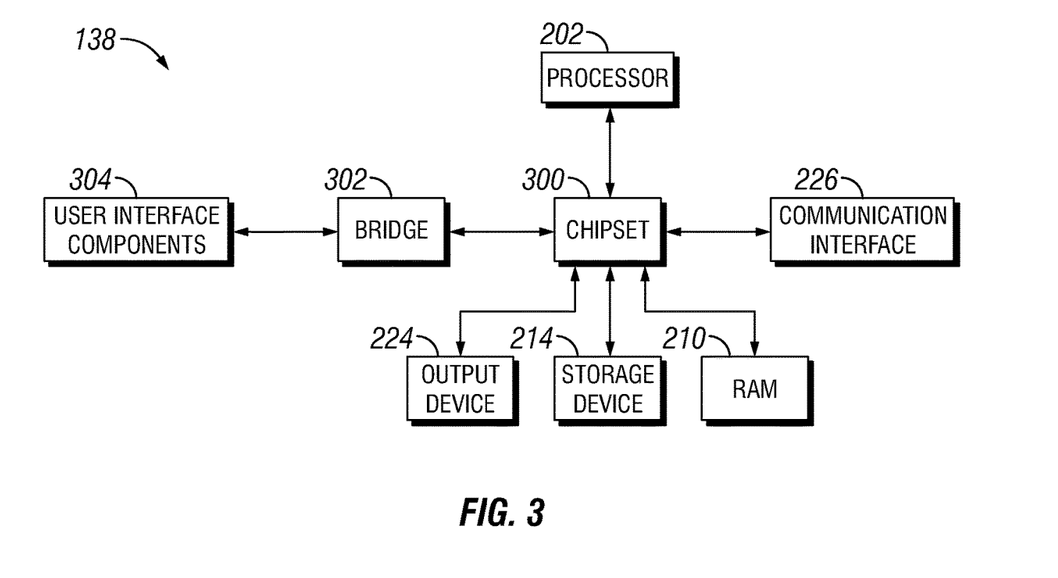
FIG. 3 is another schematic view of the information handling system of FIG. 2.

In examples, one or more parts of the example information handling system 138, up to and including the entire information handling system 138, may be virtualized. For example, a virtual processor may be a software object that executes according to a particular instruction set, even when a physical processor of the same type as the virtual processor is unavailable. A virtualization layer or a virtual "host" may enable virtualized components of one or more different computing devices or device types by translating virtualized operations to actual operations. Ultimately however, virtualized hardware of every type is implemented or executed by some underlying physical hardware. Thus, a virtualization compute layer may operate on top of a physical compute layer. The virtualization compute layer may include one or more virtual machines, an overlay network, a hypervisor, virtual switching, and any other virtualization application FIG. 3 illustrates an example information handling system 138 having a chipset architecture that may be used in executing the described method and generating and displaying a graphical user interface (GUI). Information handling system 138 is an example of computer hardware, software, and firmware that may be used to implement the disclosed technology. Information handling system 138 may include a processor 202, representative of any number of physically and/or logically distinct resources capable of executing software, firmware, and hardware configured to perform identified computations. Processor 202 may communicate with a chipset 300 that may control input to and output from processor 202. In this example, chipset 300 outputs information to output device 224, such as a display, and may read and write information to storage device 214, which may include, for example, magnetic media, and solid state media. Chipset 300 may also read data from and write data to RAM 210. A bridge 302 for interfacing with a variety of user interface components 304 may be provided for interfacing with chipset 300. Such user interface components 304 may include a keyboard, a microphone, touch detection and processing circuitry, a pointing device, such as a mouse, and so on. In general, inputs to information handling system 138 may come from any of a variety of sources, machine generated and/or human generated.

Chipset 300 may also interface with one or more communication interfaces 226 that may have different physical interfaces. Such communication interfaces may include interfaces for wired and wireless local area networks, for broadband wireless networks, as well as personal area networks. Some applications of the methods for generating, displaying, and using the GUI disclosed herein may include receiving ordered datasets over the physical interface or be generated by the machine itself by processor 202 analyzing data stored in storage device 214 or RAM 210. Further, information handling system 138 receive inputs from a user via user interface components 304 and execute appropriate functions, such as browsing functions by interpreting these inputs using processor 202.

In examples, information handling system 138 may also include tangible and/or non-transitory computer-readable storage devices for carrying or having computer-executable instructions or data structures stored thereon. Such tangible computer-readable storage devices may be any available device that may be accessed by a general purpose or special purpose computer, including the functional design of any special purpose processor as described above. By way of example, and not limitation, such tangible computer-readable devices may include RAM, ROM, EEPROM, CD-ROM or other optical disk storage, magnetic disk storage or other magnetic storage devices, or any other device which may be used to carry or store desired program code in the form of computer-executable instructions, data structures, or processor chip design. When information or instructions are provided via a network, or another communications connection (either hardwired, wireless, or combination thereof), to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

In additional examples, methods may be practiced in network computing environments with many types of computer system configurations, including personal computers, hand-held devices, multi-processor systems, microprocessor-based or programmable consumer electronics, network PCs, minicomputers, mainframe computers, and the like. Examples may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices FIG. 4 illustrates a schematic of an example of the fluid flow system 400. In examples, fluid flow system 400 is connected to flow line 130 and pump 120, shown on FIG. 1. Fluid flow system 400 includes one or more flow lines. As illustrates, fluid flow system 400 includes a first flow line 402, a second flow line 404, and a third flow line 406. However, there may be two flow lines or more than three flow lines. First flow line 402, second flow line 404, and third flow line 406 originate from input flow line 408. Input flow line 408 may be utilized to move fluid from drilling system 100 (e.g., referring to FIG. 1) to fluid flow system 400. As discussed above, fluid flow system 400 is inline or on a diversion from flow line 130, which is a flow out from borehole 116 (e.g., referring to FIG. 1). The flow out of borehole 116 is diverted to fluid flow system 400 and returned to the drilling system 100. As the fluid, moving within input flow line 408, reaches fluid flow system 400, the fluid may enter a manifold 410, which may direct the fluid into first flow line 402, a second flow line 404, and a third flow line 406. A first valve 412 may be disposed between manifold 410 and first flow line 402, a second flow line 404, and a third flow line 406.

As illustrated in FIG. 4, there may be a separate first valve 412 in each flow line. Each first valve 412 may control the flow of fluid into first flow line 402, a second flow line 404, and/or a third flow line 406. First valve 412 may be controlled by information handling system 138, which operations of first valve 412 and information handling system 138 are discussed in greater detail below. As fluid passes through first valve 412, fluid may enter first flow line 402, a second flow line 404, and a third flow line 406. Additionally, there may be a separate first pressure sensor 414 in each flow line. First pressure sensors 414 may measure the fluid pressure in first flow line 402, a second flow line 404, and a third flow line 406. This pressure reading may be sent to information handling system 138 for further processing, discussed below.

With continued reference to FIG. 4, there may be a separate second valve 416 in each flow line. Each second valve 416 may control the flow of fluid in the fluid flow line. The second valve 416 may be operated by information handling system 138. Passing through second valve 416, the fluid may pass through second pressure sensor 418. In examples, there may be a separate second pressure sensor 418 in each flow line. The second pressure sensors 418 may measure the fluid pressure in first flow line 402, a second flow line 404, and a third flow line 406. This pressure reading may be sent to information handling system 138 for further processing, discussed below. The fluid may then pass through or be halted by third valve 420. Third valve 420 may be controlled by information handling system 138, as discussed below.

After passing through third valve 420, first flow line 402, second flow line 404, and third flow line 406 converge into output flow line 422. As fluid flow through output flow line 422, the fluid may pass through temperature transducer 424. Temperature transducer 424 may function and operate to compensate fluid flow system 400 (e.g., referring to FIG. 4) for changes in density and monitor flow out temperature in fluid. After the fluid passes through temperature transducer 424, the fluid may move through output flow line 422 back to drilling system 100.

During downhole operations, fluid may flow out of borehole 116 and into fluid flow system 400. Based on the fluid flow rate, the fluid may be diverted to first flow line 402, second flow line 404, or third flow line 406. For example, the first flow line 402, second flow line 404, and third flow line 406 may each be designated as a high flow leg, a medium flow leg, or a low flow leg. In examples, it does not matter which of first flow line 402, second flow line 404, and third flow line 406 is a high flow leg, a medium flow leg, or low flow leg. For this example, first flow line 402 is the high flow leg, second flow line 404 is the medium flow leg, and third flow line 406 is the low flow leg. During operations, flow rate is measured at first pressure sensor 414 and second pressure sensor 418. As discussed above, there is a first pressure sensor 414 and second pressure sensor 418 in first flow line 402, second flow line 404, and third flow line 406. The fluid flow rate may be determined by comparing the pressure from first pressure sensor 414 and second pressure sensor 418 to determine the difference at pressure at first pressure sensor 414 and second pressure sensor 418. The pressure drop is used in any number of known pressure equations to determine fluid flow rate in a fluid flow line. For example, Bernoulli's Equation may be used with the identified pressure drop, known velocity, known density of the fluid, gravity, and height. In other examples, the venturi effect may be utilized with the Bernoulli Equation. In this example, the pressure difference is used along with the identification if the fluid flow is turbulent or laminar. Additionally, fluid velocity, kinematic viscosity, the Reynolds number, internal roughness of the pipe, diameter of the pipe, and length of the pipe are known or assumed. Used together, the known variables may be used to determine fluid flow.

In examples, fluid may have a low flow rate and flow through the low flow leg, third flow line 406. As the fluid flow increases, first pressure sensor 414 and second pressure sensor 418 may measure the increase, which is sent to information handling system 138. Information handling system 138 may divert fluid flow to second flow line 404, the medium leg. This may be performed by closing first valve 412 of first flow line 402 and opening first valve 412 of second flow line 404. This process may be repeated to divert the fluid from second flow line 404 to third flow line 406, the high flow leg, if fluid flow continues to increase. Table 1 below illustrates an example scheme for changing between fluid flow lines.

TABLE 1

| Fluid Flow Mode | Flow rate range (gpm) | Increasing flow rate change point (gpm) | Decreasing flow rate change point (gpm) |
| --- | --- | --- | --- |
| Low | 10-300 | 300 | — |
| Medium | 200-1000 | 1000 | 200 |
| High | 900-2000 | — | 900 |

Figure 5:
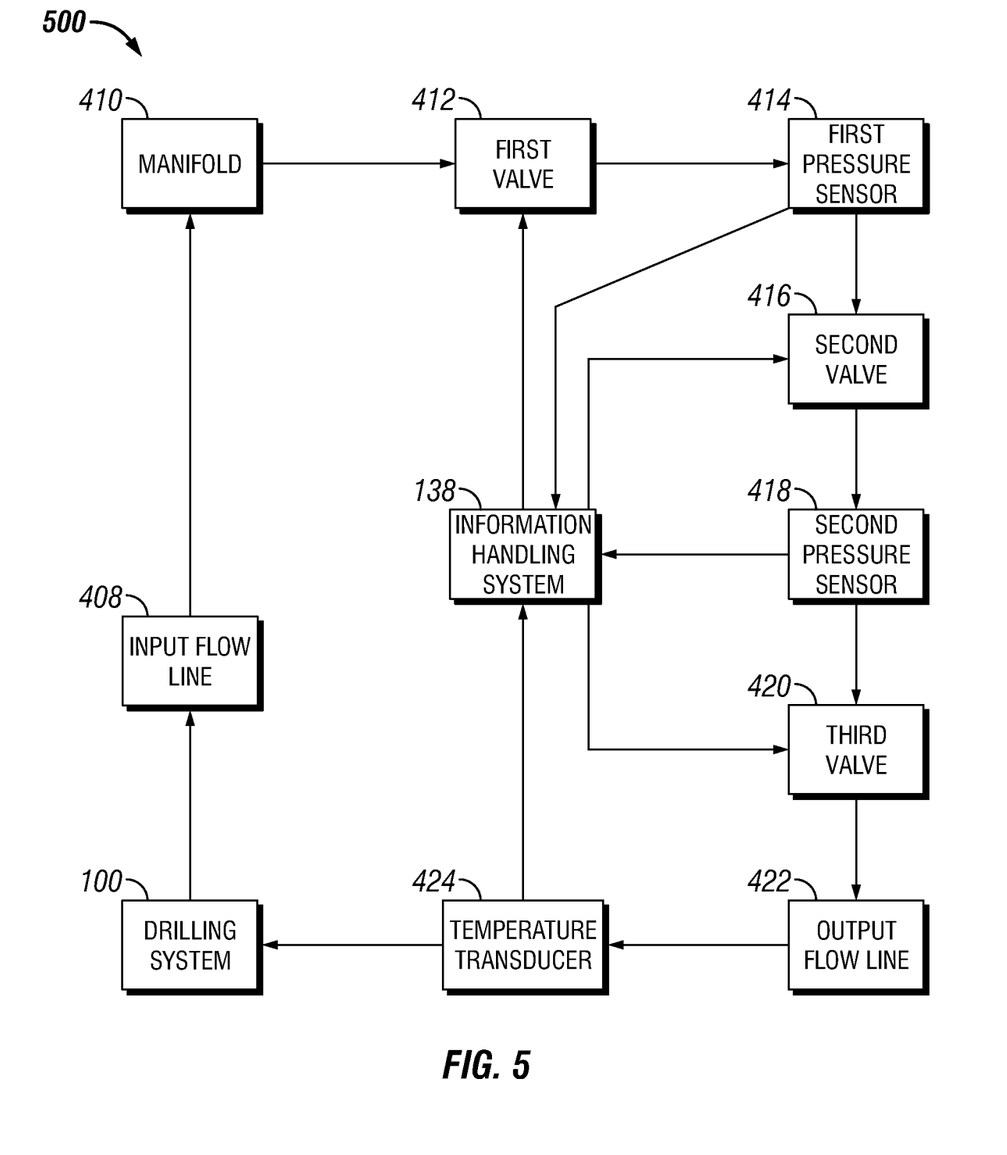
FIG. 5 is an example workflow for the fluid flow system.

FIG. 5 illustrates control system 500, which may control each valve within fluid flow system 400 based at least in part on measurements received from first pressure sensor 414, second pressure sensor 418, or temperature transducer 424. Measurements received by information handling system 138 may be used by information handling system 138 to control fluid flow through first flow line 402, second flow line 404, and third flow line 406 (e.g., referring to FIG. 4). As illustrated in FIG. 5, fluid flow may move from drilling system 100 to input flow line 408. The fluid may flow from input flow line 408 to a manifold 410. From manifold 410, the fluid may move through a first valve 412. First valve 412 may be in first flow line 402, second flow line 404, and third flow line 406.

During operations, information handling system 138 may open first valve 412 in either first flow line 402, second flow line 404, or third flow line 406 (e.g., referring to FIG. 4). This may direct fluid into either first flow line 402, second flow line 404, or third flow line 406. As discussed above, for this example, first flow line 402 is a low flow leg, second flow line 404 is a medium flow leg, and third flow line 406 is a high flow leg. However, first flow line 402, second flow line 404, or third flow line 406 may be designated as either low flow leg, medium flow leg, or high flow leg.

After passing through first valve 412, fluid may flow through first pressure sensor 414. First pressure sensor 414 may measure the fluid flow and send the measurement to information handling system 138 as a first pressure measurement. The first pressure measurement may be compared to Table 1, above, to determine if the fluid flow is designated as a low flow, a medium flow, or a high flow. The fluid may continue to move through second valve 416, which may be open in the same flow line as first valve 412 that is open. Passing through second valve 416, the fluid may be measured by second pressure sensor 418. The pressure measurement may be sent to information handling system 138 as a second pressure measurement. The second pressure measurement may be compared to Table 1, above, to determine if the fluid flow is designated as a low flow, a medium flow, or a high flow. The first pressure measurement and second pressure measurement are compared and used to calculate pressure drop over the hole, wedge, torrid, or other pressure drop mechanism. Fluid may flow through second pressure sensor 418 and through third valve 420.

FIG. 5 illustrates a workflow for fluid flow system 400 (e.g., referring to FIG. 4). As illustrated in FIG. 5, first pressure measurement from first pressure sensor 414 and second pressure measurement from second pressure sensor 418 may be sent to information handling system 138 to be processed. For example, the first pressure measurement and the second pressure measurement may be compared to Table 1 to determine if there is high fluid flow, medium fluid flow, or low fluid flow. After determining the fluid flow with information handling system 138, information handling system 138 may open first valve 412, second valve 416, and third valve 420 of first flow line 402, second flow line 404, or third flow line 406. The flow line opened will be the flow line that is designated as the low flow leg, medium flow leg, or high flow leg. The other flow lines will be closed. If fluid flow is increasing, the change in which leg is operated will occur when the maximum fluid flow (as seen above in Table 1) of the lower leg is reached. If the flow is decreasing, the change in which leg is operated will occur when the minimum of the upper leg is reached (as seen above in Table 1).

The operation described above is performed because each flow line may be specifically designed to move low fluid flow, medium fluid flow, or high fluid flow. Thus, backpressure may be maintained within fluid flow system 400 (e.g., referring to FIG. 4) for any type of fluid flow. The backpressure is maintained to ensure that the pipe remains full and that the pressure transducers may not approach zero. Although not illustrated, to measure backpressure, backpressure sensors may be disposed on each flow line. In additional examples, the selection between the low flow leg, medium flow leg, or high flow leg may be determined from a calculated pump rate for pump 120 (e.g., referring to FIG. 1), which includes one or more pistons, using the Equation below:

$$\text{Flow rate} = pi * \left(\frac{\text{diameter}}{2}\right)^2 * \text{stroke length} * \text{strokes/min} \quad (1)$$

where the variable diameter is the diameter of the piston, the variable stroke length is the maximum movement of the piston during operation, and the variable strokes is the number of strokes the piston performs in a minute. In other examples, fluid flow system 400 may measure fluid flow into a fluid line and measure fluid flow out of a fluid line. If the density is needed, it may be manually inputted or measured by a sensor in the system. In examples, the fluid density may be obtained by mud balance, Coriolis meter that is sampling the drilling fluid, or other density measurement methods. The density is used in the mechanical energy balance using the Bernoulli's Equation to solve for fluid flow.

Current fluid flow systems include large diversions within the drilling system which create issues of backpressure. Specifically, the lack of backpressure may create issue for measuring fluid density and other properties. The methods and systems described above include the control and layout of sensors, which allow for inline operation without the need for large diversions and the issue of backpressure/full pipe on the sensors is solved. Accurate flow out measurement without the need to divert the flow line reducing installation cost. Additionally, the sensor package is equivalent or lower cost than a Coriolis meter and covers a greater range of flow rates. The methods and apparatus may include any of the various features disclosed herein, including one or more of the following statements.

Statement 1: A fluid flow system may comprise an input line connected to a drilling system, one or more fluid flow lines connected to the input line, and an output line connected to the one or more fluid flow lines. The system may further comprise one or more valves disposed in each of the one or more fluid flow lines and one or more pressure sensors disposed in each of the one or more fluid flow lines.

Statement 2. The system of statement 1, further comprising a temperature sensor connected to the output line.

Statement 3. The system of statements 1 or 2, wherein the one or more fluid flow lines comprises a low fluid flow line, a medium flow fluid line, and a high fluid flow line.

Statement 4. The fluid flow system of statement 3, wherein the low fluid flow line is configured for a fluid flow of 10 to 300 gallons per minute.

Statement 5. The fluid flow system of statement 3, wherein the medium fluid flow line is configured for a fluid flow of 200 to 1000 gallons per minute.

Statement 6. The fluid flow system of statement 3, wherein the high flow line is configured for a fluid flow of 900 to 2000 gallons per minute.

Statement 7. The fluid flow system of statements 1, 2, or 3, further comprising an information handling system.

Statement 8. The fluid flow system of statement 7, wherein the one or more valves are connected to and controlled by the information handling system.

Statement 9. The fluid flow system of statement 8, wherein the one or more pressure sensors are connected to and communicate with the information handling system.

Statement 10. The fluid flow system of statement 9, wherein the information handling system is configured to operate the one or more valves based at least in part on one or more measurements from the one or more pressure sensors.

Statement 11. A method for controlling a fluid flow system may comprise moving a drilling fluid from a borehole into an input line of the fluid flow system, directing the drilling fluid through the input line into a fluid flow line, wherein one or more valves are disposed in the fluid flow line, measuring a first pressure at a first pressure sensor in the fluid flow line, and measuring a second pressure at a second pressure sensor in the fluid flow line. The method may further comprise determining a fluid flow rate in the fluid flow line by finding the difference between the first pressure measurement and the second pressure measurements; and moving the drilling fluid into another fluid flow line based on the fluid flow rate.

Statement 12. The method of statement 11, wherein the fluid flow system further comprises a temperature sensor disposed in an output line.

Statement 13. The method of statement 12, further comprising measuring a temperature of the drilling fluid with a temperature sensor.

Statement 14. The method of statement 13, wherein the adjusting the fluid flow rate is further based at least in part on the temperature.

Statement 15. The method of statement 11 or 12, wherein the fluid flow rate through a low flow leg is 10 to 300 gallons per minute.

Statement 16. The method of statement 15, wherein the fluid flow rate through a medium flow leg is 200 to 1000 gallons per minute.

Statement 17. The method of statements 11, 12, or 15, wherein the fluid flow rate through a high flow leg is 900 to 2000 gallons per minute.

Statement 18. The method of statements 11, 12, 15, or 17, further comprising taking a backpressure measurement and opening or closing the one or more valves based at least in part on the backpressure measurement.

Statement 19. The method of statements 11, 12, 15, 17 or 18, further comprising taking a pump rate measurement and selecting the fluid flow line based at least in part on the pump rate measurement.

Statement 20. The method of statements 11, 12, 15, or 17-19, further comprising taking a density measurement and selecting the fluid flow line based at least in part on the density measurement.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, as the present embodiments may be modified and practiced in different but equivalent manners apparent to those skilled in the art having the benefit of the teachings herein. Although individual embodiments are discussed, all combinations of each embodiment are contemplated and covered by the disclosure. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

What is claimed is:

1. A method for controlling a fluid flow system comprising:
   moving a drilling fluid from a borehole into an input line of the fluid flow system;
   directing the drilling fluid through the input line into one of a plurality of fluid flow lines, wherein the one of a plurality of fluid flow lines is an active fluid flow line, wherein one or more valves are disposed in the plurality of fluid flow lines, and wherein the plurality of fluid flow lines comprise a low flow fluid line, a medium flow fluid line, and a high flow fluid line;
   measuring a first pressure at a first pressure sensor in the active fluid flow line;
   measuring a second pressure at a second pressure sensor in the active fluid flow line;
   determining a fluid flow rate in the active fluid flow line by finding the difference between the first pressure measurement and the second pressure measurements; and
   moving the drilling fluid into another fluid flow line based on the fluid flow rate if a fluid flow rate change point is met.

2. The method of claim 1, wherein the fluid flow system further comprises a temperature sensor disposed in an output line.

3. The method of claim 2, further comprising measuring a temperature of the drilling fluid with a temperature sensor.

4. The method of claim 3, wherein the adjusting the fluid flow rate is further based at least in part on the temperature.

5. The method of claim 1, wherein the fluid flow rate through a low flow leg is 10 to 300 gallons per minute.

6. The method of claim 1, wherein the fluid flow rate through a medium flow leg is 200 to 1000 gallons per minute.

7. The method of claim 1, wherein the fluid flow rate through a high flow leg is 900 to 2000 gallons per minute.

8. The method of claim 1, further comprising taking a backpressure measurement and opening or closing the one or more valves based at least in part on the backpressure measurement.

9. The method of claim 1, further comprising taking a pump rate measurement and selecting the active fluid flow line based at least in part on the pump rate measurement.

10. The method of claim 1, further comprising taking a density measurement and selecting the active fluid flow line based at least in part on the density measurement.

11. The method of claim 1, further comprising controlling the one of more valves with an information handling system based at least in part on the first pressure from the first pressure sensor.

\* \* \* \* \*